United States Patent [19]
Stonner et al.

[11] 3,820,954
[45] June 28, 1974

[54] SEPARATOR FOR LIQUID-LIQUID EXTRACTORS

[75] Inventors: Hans-Martin Stonner, Frankfurt am Main; Erhard Kraus, Muhlheim am Main, both of Germany

[73] Assignee: Metallgesellschaft Aktiengesellschaft, Frankfurt am Main, Germany

[22] Filed: July 18, 1972

[21] Appl. No.: 272,915

[30] Foreign Application Priority Data
July 21, 1971  Germany............................ 2136397

[52] U.S. Cl................ 23/267 R, 23/270.5, 210/521
[51] Int. Cl.... B01d 11/04, B01d 17/02, B01d 17/10
[58] Field of Search......... 23/267 R, 270.5; 210/521

[56] References Cited
UNITED STATES PATENTS

| | | | |
|---|---|---|---|
| 1,176,775 | 3/1916 | Morris | 210/521 |
| 2,134,203 | 10/1938 | Raymond | 210/521 |
| 2,347,810 | 5/1944 | Brandt | 210/521 |
| 2,375,590 | 5/1945 | Schonberg | 210/521 |
| 2,497,392 | 2/1950 | Breukel | 210/521 |
| 2,728,714 | 12/1955 | Winkler | 23/267 MS |

*Primary Examiner*—Norman Yudkoff
*Assistant Examiner*—S. J. Emery
*Attorney, Agent, or Firm*—Burgess, Dinklage & Sprung

[57] ABSTRACT

A phase separator for liquid-liquid extractors is disclosed and includes a mixer and a separator. A separator housing has an inlet for a mixture of phases and an outlet for separated pure phases. Internal fixtures are included which promote the separation of the phases and include horizontally extending flat boxes disposed one over the other and open at at least one major surface. Each of the boxes has at least one outlet at one edge of the closed major surface which opens to the surrounding space of the separator housing. These outlets are in the form of discharge weirs. Each box also has an inlet for the mixture of phases to be separated. The boxes are positioned in the separator housing one over the other so as to be coextensive at least in their longitudinal direction. The inlets for the boxes are walls which are outwardly inclined from the boxes and the discharge weirs are inwardly inclined to the boxes.

4 Claims, 5 Drawing Figures

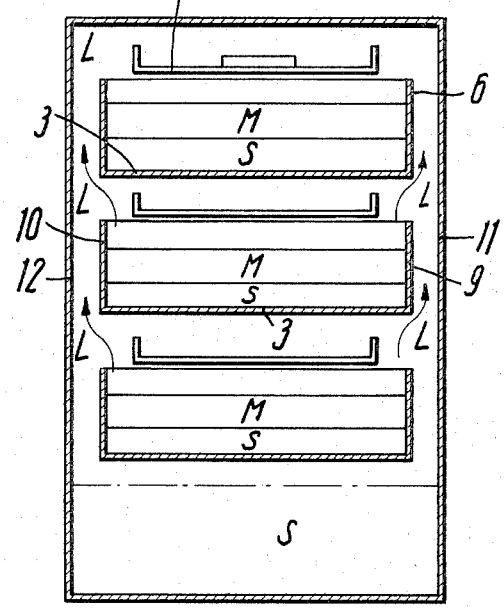
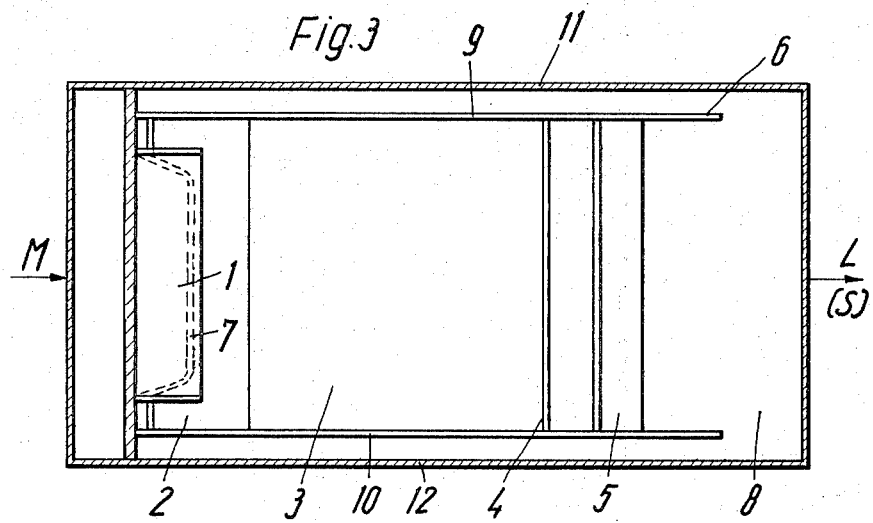

SEPARATOR FOR LIQUID-LIQUID EXTRACTORS

RELATED APPLICATIONS

This application is related to copending U.S. Pat. application Ser. No. 314,041, filed Dec. 11, 1972, which is a continuation of U.S. Pat. Ser. No. 108,860 filed Jan. 22, 1971, now abandoned for "Settler For Liquid-Liquid Extractors."

BACKGROUND

U.S. Pat. application Ser. No. 108,860 relates to a phase separator for liquid-liquid extractors and discloses a mixer and separator including a separator housing, a supply conduit for a phase mixture, discharge conduits for the separated, pure phases, and internal installations which promote the separation of phases and consist of substantially horizontally extending, flat boxes, which are disposed one over the other, and are open at one major surface and at the edge of the closed major surface are provided with at least one discharge opening to constitute discharge weirs, each box having associated with it an inlet for the phase mixture to be separated.

The present invention relates to an improvement in the phase separation of U.S. Pat. application Ser. No. 108,860 so as to enable the accommodation of a larger separating area in a given three-dimensional, preferably parallelepipedic, separating space as regards its separating area.

This object is accomplished according to the invention in that the boxes are disposed one over the other with plan outlines which are coextensive at least in their longitudinal direction, the phase mixture is supplied over a wall which is outwardly inclined from the box, and the discharge weirs are inwardly inclined to the box.

SUMMARY

The present invention provides a phase separator for liquid-liquid extractors comprising a mixer and a separator means. Included are separator housing means having inlet means for a mixture of phases and outlet means for the separated pure phases, internal means which promote the separation of the phases including substantially horizontally extending flat box means disposed one over the other and open at at least one major surface, each of said box means having at least one outlet at one edge of the closed major surface opening to the surrounding space of the housing means, said outlets being in the form of discharge weir means, each of said box means having an inlet for the mixture of phases to be separated. The improvement of the invention comprises positioning the box means one over the other so as to be coextensive at least in their longitudinal direction, the inlets for said box means being wall means outwardly inclined from the box means and the discharge weir means being inwardly inclined to the box means.

In a preferred embodiment the sidewalls of the box means extend into the housing means beyond the outwardly inclined inlet wall means and the discharge weir means to form lateral guiding means which may be interconnected.

DESCRIPTION OF THE DRAWING

The present invention will be more fully understood from the following description taken in conjunction with the accompanying drawing wherein.

FIG. 2 is a vertical sectional view taken along line A—A of FIG. 1; and

FIG. 3 is a horizontal top view partly in section taken along B—B of FIG. 1.

DESCRIPTION

In the arrangement of the invention an inlet opening is presented to the incoming phase mixture and the outgoing phase cannot exert a dynamic pressure on the discharge weir of the adjacent box; such dynamic pressure would change the level of the mixed phase in said box.

The boxes are preferably rectangular and should have base areas of equal size. The boxes are diposed one over the other. The phase mixture to be separated is fed to each box over the inlet opening. The separated phases are discharged from each box. Excessive mixed phase flows into the adjacent box over the wall which is outwardly inclined from the box.

The inlet openings at the boxes consist preferably of outwardly inclined walls of the boxes and include an angle of more than 90° and less than 180°, particularly of 120° – 150° and especially of about 135°, with the closed major surface of the box.

The discharge openings at the boxes are preferably formed by weirs, which are inwardly inclined to the box. They include an angle of more than 0° and less than 90°, particularly of 40° – 70° and especially of about 60° with the closed major surface of the box.

The boxlike installations may be disposed in the separator in each of the light-phase and heavy-phase regions as one group or as a plurality of groups above and below the interface level defined by the discharge of the pure heavy phase. The open-topped, tub-shaped boxes are used only in the light-phase region and the open-bottomed, hood-shaped boxes are used only in the heavy-phase region.

The boxes are arranged in the housing substantially in such a manner that the closed major surface of each box extends approximately horizontally. It may be of advantage, however, to arrange the boxes with a slight inclination. As a result of such inclination of the boxes, the pure lighter phase forms a thicker layer in the higher portion and the pure heavier phase forms a thicker layer in the lower portion. In general, the inclination of the major surfaces from the horizontal is desirably smaller than 15°.

Figure 4A:
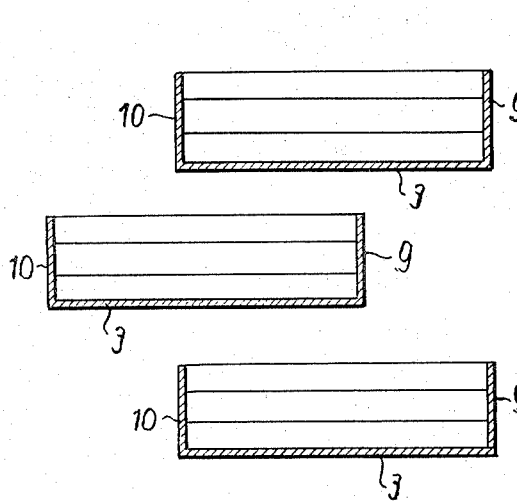
FIGS. 4a and b are vertical sectional views of alternate embodiments of the separator shown in FIG. 1 wherein the boxes are arranged in a zig-zag configuration (FIG. 4a) and in a cascade configuration (FIG. 4b).
Figure 4B:
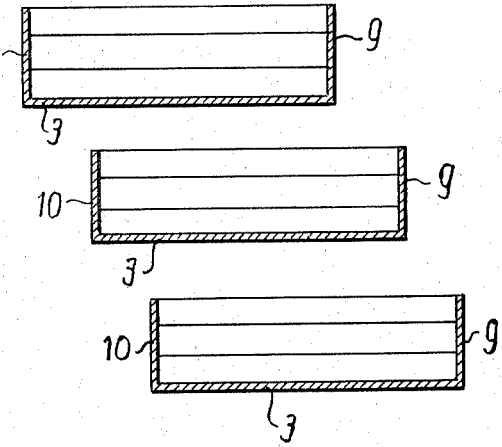

According to an optional feature of the invention, the boxes are offset transversely to their longitudinal direction in alteration (FIG. 4a) or to form steps (FIG. 4b), and the longitudinal side of a box is disposed over the box opening of the adjacent box.

The boxes consisting of open-topped tubs or open-bottomed hoods may be relatively offset in one horizontal direction in such a manner that one side of a box is disposed over or under the open major surface of an adjacent box. That side is then lower than the others or is provided with incisions at its free edge so that phase mixture can flow over at said edge. If the boxes are arranged in cascade (FIG. 4b) or zigzag (FIG. 4a), the phase mixture to be separated is preferably supplied in excess to the uppermost and/or lowermost boxes so that part of the mixture is discharged to the adjacent box and the succeeding boxes whereas separated pure phase flows from each box through the underflow or overflow weir, namely, the light phase from the open-bottomed hoods and the heavy phase from the open-topped tubs. In that embodiment, the phase mixture to be separated may be supplied to a plurality of boxes of a group and this supply may be effected in addition to the main portion supplied to the uppermost and/or lowermost boxes. In this way, the load per surface area of each box can be changed and matched.

In a preferred apparatus which has been improved according to the invention, the boxes are disposed one over the other so as to be coextensive in plan outline and have incisions in their walls 2 which are outwardly inclined from the box.

In such arrangement, the internal space of a separator may be better filled with boxes thus arranged, and relatively small collecting spaces for the pure phases are left free above and below the installations. In this embodiment, one of the two side walls which are not provided with inclined edges may directly adjoin the housing wall or may coincide with or be replaced by it.

In this embodiment having coextensive plan outlines, the outwardly inclined edges of the inlet wall are formed with one or more indentations or cutouts so that surplus phase mixture can flow over said edge. The supply troughs disposed above or below the indentation prevent a free, uncontrolled discharge of the surplus mixed phase and ensure that the same enters the adjacent box. The supply trough preferably extends beyond the indentations.

Turbulence before the discharge weirs would result in a mixing of phases. To prevent or at least restrict such turbulence, the discharge weir is preceded by a limiting weir, which extends from the major surface of the next upper box and throughout the width of the discharge side and is immersed into the phase being discharged.

To reduce turbulent flow in the separating space outside the boxes, those remaining portions of the longitudinal walls which protrude over the inlet openings and the discharge weirs are preferably left to extend beyond the limiting weir into the housing. It may be desirably firmly to connect said remaining portions to the vertically adjacent remaining portions of the adjacent boxes.

With the aid of the boxlike installations provided according to the invention, the rate of phase separation may be multiplied to such a degree that, in dependence on the number of boxes installed, a separator requires only about 10 – 60 percent of the floor area of a separator having an empty internal space for the same throughput rate. Another advantage of the invention resides in that instead of requiring a multiplicity of boxes differing in size, a given housing may be provided with boxes which are uniform in form and size. The same is applicable to the design of the inlets through the housing wall and the associated supply troughs. Boxes in accordance with the invention may be made in a simple manner from a suitably blanked plate or sheet metal by folding.

Figure 1:
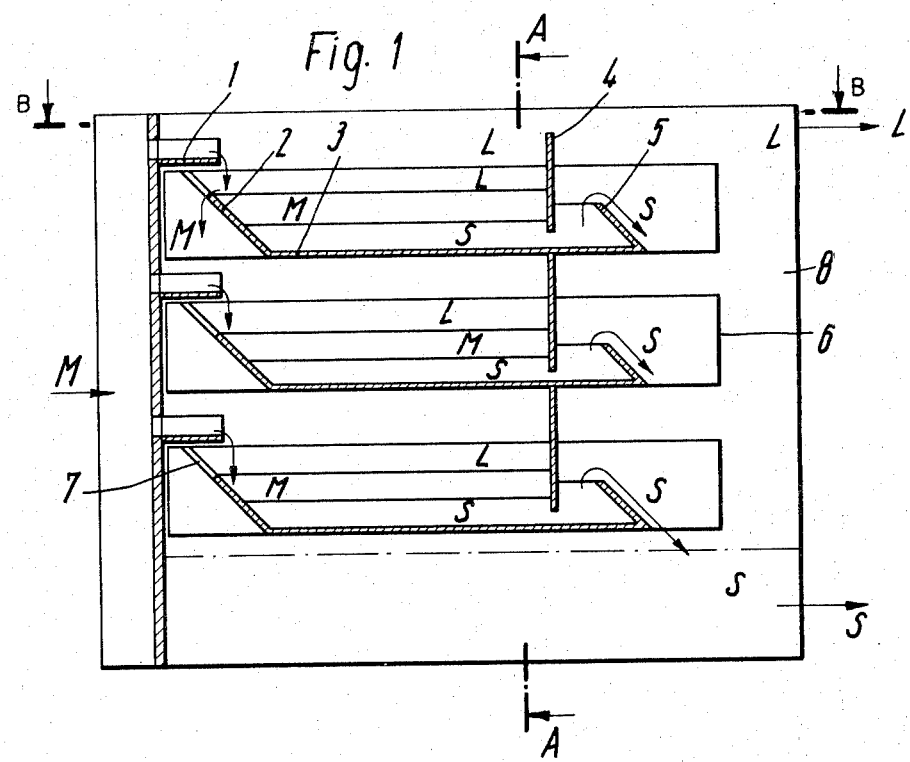
FIG. 1 is a vertical sectional view taken in the direction of flow of the mixture of phases through three flat boxes which are disposed one over the other and consist of open topped hoods.

An embodiment of the apparatus according to the invention is shown by way of example in FIGS. 1 to 3. In all figures, the phase mixture to be separated is designated M, the pure light phase is designated L and the pure heavy phase is designated S.

The boxes shown in FIGS. 1 to 3 are representative of a group, which may comprise a large number of boxes, up to more than 30. The boxes have an open-topped major surface, a bottom-forming, closed major surface 3, an outwardly inclined inlet wall 2, which is disposed under the inlet trough 1, a wall 5 which is inwardly inclined to the box and forms a discharge weir, and vertical side walls 9 and 10, which may adjoin the housing walls 11 and/or 12. It is desirable, however, to provide such a large distance between a longitudinal wall 9 or 10 and the corresponding housing wall 11 or 12 that the pure light phase can flow to the collecting space for the light phase.

The inlet wall 2 is inclined toward the supply trough 1 and includes an angle of about 135° with the closed major surface of the box. Through the resulting opening, the inflowing mixed phase can enter the boxes and be received by them. The discharge weir 5 has an inclination of 45° approximately in the same direction so that the pure heavy phase S to be discharged can slip down. In this arrangement, the pure heavy phase is conducted away from the adjacent lower boxes and cannot give rise to a dynamic pressure, which would adversely affect the discharge of the pure heavy phase from the lower boxes.

The discharge weir 5 for the pure heavy phase S is preceded by a limiting weir 4, which extends from the closed major surface 3 of the next upper box (except for the uppermost box) across the width 5 and into the heavy phase so that the pure heavy phase S before flowing out of the box must flow through the gap defined between the closed major surface 3 and the limiting weir 4 and the pure heavy phase is retained before the discharge weir 5 so that a phase equilibrium is established on the box.

Subsequent corrections may be effected, e.g., by decreasing or increasing the inclination of the inclined walls in dependence on the specific gravities of the phases.

A uniform supply to the boxes is promoted by the inlet wall 2, which is lower than the other box walls because the incoming mixed phase can enter the box over the inlet wall 2 only until the equilibrium has been established whereas excessive quantities of mixed phase flow over the edge of the inlet wall 2 and are fed by the supply trough 1 to the next lower box. For this purpose, the width of the supply trough 1 exceeds the width of the incisions in the inlet wall 2 and the supply trough 1 extends beyond the edge of the adjacent box.

FIGS. 1 and 3 show the functional relation of the supply trough 1 to the indentation or cutout 7 or in the upper edge of inlet wall 2. In FIG. 3 the indentation is shown by dotted lines since the inlet trough 1 extends beyond same as is more clearly shown in FIG. 1. For this purpose, the supply trough 1 has correspondingly wide edges and extends beyond the inclined inlet wall 2 of the associated box and to such an extent below the indentations 7 of the next upper box that the entire surplus of the mixed phase M can be supplied through the inlet trough only to the next lower box.

The light phase L may escape through the openings between the longitudinal sides 9 and/or 10 of the boxes spaced one over the other and may be received by the surrounding light phase L. The side walls 9 and 10 are preferably longer than the closed major surface 3 and with the remaining surfaces 6 extend at one end over the inlet wall 2 and at the other end over the discharge weir 5 into the separator housing to ensure a good guidance of the pure phase in the first-mentioned case and of the mixed phase in the second case.

Below the light phase L and the heavy phase S, adjacent to the heavy phase, the same boxes together with their inlet plate have been turned through 180° and are used in the form of open-bottomed hoods.

The boxes according to the invention can be very easily made in quantities from metal plates. For this purpose, the initial plate is provided with cutouts extending from the ends of the plate in the longitudinal direction for an extent which corresponds to the depth of the bottom. At that end where the inlet wall 2 is to be formed, the plate is provided with a cut-out or indentation 7 extending only over part of the width of that end. The inlet wall 2 and the discharge weir 5 are bent up and reversely bent, respectively. The limiting weir 4 is tightly welded to the undersite of the bottom. Depending on the intended use of the box, narrow strips are lanced from the bent-up edges of the sides 9 and/or 10 in that portion which is intended to engage the limiting weir 4. The strips extend toward the inlet wall 2 and terminate in line with the base of its slope. These strips are intended to promote the discharge of the light phase L in tub-shaped boxes. The remaining portions of sides 9 and 10, particularly the remaining surfaces 6 extending from the limiting weir 4 substantially beyond the discharge weir 5, are joined to the corresponding remaining surfaces of the upper and lower tubs, e.g., by welded connectors, such as rods, so that stacks of boxes are formed which can be inserted as a unit into the separator.

What is claimed is:

1. In a phase separator for liquid-liquid extractors comprising a mixer and separator means including separator housing means having inlet means for a mixture of phases and outlet means for the separated pure phases, internal means which promote separation of said phases including substantially horizontally extending, vertically spaced, parallel flat box means disposed one over the other having an open top or bottom and a correspondingly closed bottom or top, each of said box means having at least one discharge weir means at an edge of its closed bottom or top opening to the surrounding space of the separator housing means, each of the said box means having separate inlet means for the mixture of phases to be separated, the improvement which comprises positioning the box means coextensively one over the other at least in their longitudinal direction, said box means having wall means outwardly inclined from the box means positioned adjacent the inlet means for each box means, and the discharge weir means being inwardly inclined to the box means and preceded by stationary limiting weir means extending from the adjacent box means along the length of the side of the box means having the discharge weir means and into the phase being discharged.

2. Phase separator of claim 1 wherein the box means are offset from each other in alternation or to form steps transversely to their longitudinal direction, and one longitudinal side of a box means extending over or under the free major surface of the adjacent box means.

3. Phase separator of claim 1 wherein the box means are coextensively disposed one over the other and have cutouts in the wall means outwardly inclined from the box means.

4. Phase separator of claim 1 wherein the box means have sidewall means extending into housing means beyond the outwardly inclined inlet wall means and the discharge weir means to form lateral guiding means.

* * * * *